United States Patent
Skidmore et al.

(10) Patent No.: US 6,912,596 B2
(45) Date of Patent: Jun. 28, 2005

(54) AUTOMATIC RESUME FROM SUSPEND FOR IEEE-1394 PHY

(75) Inventors: James M. Skidmore, Frisco, TX (US); Burke S. Henehan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 529 days.

(21) Appl. No.: 10/211,805

(22) Filed: Aug. 2, 2002

(65) Prior Publication Data

US 2004/0024918 A1 Feb. 5, 2004

(51) Int. Cl.[7] .............................. G06F 3/00; G06F 9/00; G06F 15/76
(52) U.S. Cl. ............................ 710/1; 712/35; 712/225; 718/100; 370/463
(58) Field of Search ..................... 710/1.15, 18, 260, 710/49, 104, 105, 33; 713/100, 323; 714/15; 718/100, 107; 709/232, 238, 250; 712/35, 225; 370/463, 469, 419

(56) References Cited

U.S. PATENT DOCUMENTS

| | | | | |
|---|---|---|---|---|
| 5,446,904 A | * | 8/1995 | Belt et al. .................... 713/323 |
| 6,330,584 B1 | * | 12/2001 | Joffe et al. ................... 718/107 |
| 6,502,207 B1 | * | 12/2002 | Itoh et al. ...................... 714/15 |
| 6,732,191 B1 | * | 5/2004 | Baker et al. ................... 710/1 |
| 6,795,450 B1 | * | 9/2004 | Mills et al. .................. 370/463 |

OTHER PUBLICATIONS

"Consistent state restoration in shared memory systems" by Baldoni, R.; Helary, J.–M.; Mostefaoui, A.; Raynal., M. (abstract only Publication Date:Mar. 19–21, 1997.*

"Searching with numbers" by Agrawal, R.; Srikant, R. (abstract only) Publication Date: Jul.–Aug. 2003.*

* cited by examiner

*Primary Examiner*—Gopal C. Ray
(74) *Attorney, Agent, or Firm*—J. Dennis Moore; W. James Brady, III; Frederick J. Telecky, Jr.

(57) ABSTRACT

A system and process are disclosed for automatically resuming data communication using an IEEE-1394 PHY when communication is suspended because input bias is momentarily lost. The PHY determines whether data communication is suspended due to the PHY being disconnected from a network by checking the status of a connected flag. If the connected flag is still set to TRUE, the PHY was not intentionally disconnected from the network and it automatically attempts to resume communication by setting a resume flag to TRUE. The invention finds application in any type of communication device using the IEEE-1394 high-speed serial bus standard including audio and video sources, which may readily be connected to a personal computer for data storage or editing. The system and process may be implemented using software code and included within a digital signal processor (DSP).

16 Claims, 2 Drawing Sheets

AUTOMATIC RESUME FROM SUSPEND FOR IEEE-1394 PHY

TECHNICAL FIELD

The present invention relates generally to a system and process for controlling a physical layer interface (PHY) in a communication system, and more particularly to a system and process for automatically resuming communication when input bias is momentarily lost.

BACKGROUND

Electronic systems include a number of components, each of which performs various functions. These components must be interconnected either by connecting individual components together and/or by connecting the individual components to a data bus. Various different types of buses have been developed depending on the type of components to be connected and their data rates. For example, a parallel bus includes multiple data lines allowing simultaneous transfer of multiple bits of data. In contrast, a serial data bus includes only a single data line and may optionally include a clock line to ensure proper decoding of data.

The IEEE-1394 standard provides for a high-speed serial bus and has been broadly adopted by the consumer electronics (CE) industry as the single bus standard to unify communications between emerging all-digital CE devices. Due to the IEEE-1394 standard's small connectors and serial data cables, IEEE-1394-enabled devices are consumer friendly. Furthermore, the IEEE-1394 standard's protocol supports plug-and-play operation. As the IEEE-1394 standard becomes available on more CE devices, such as a digital video recorder 102, a digital cable set top box 104, a digital television 106 and an audio source 108, the devices being daisy chained together as shown in FIG. 1 as part of an IEEE-1394-based network 100. These audio and video devices may be connected to a personal computer 110, though this is not required. The personal computer itself may include peripheral devices such as an external hard disk drive 112 and a printer 114, to which a digital camera 116 may be attached.

As part of the IEEE-1394 standard, which is hereby incorporated by reference, individual devices can be placed into a suspended state to conserve energy. For example, when data is no longer required from the digital video recorder 102, the personal computer 110 can place the digital video recorder 102 in a suspended state. When data is later required from the digital video recorder 102, the personal computer 110 will send a resume command to the digital video recorder 102 and data can once again be received from this source by the personal computer 110.

For devices operating under the IEEE-1394-95 or -1394a standards, or for a device operating under the IEEE-1394b standard with a port in data strobe (D/S) mode, the loss of input bias causes the device's PHY port to transition into a suspended state. A problem arises when the loss of input bias is only momentary and not intended to transition the device into a suspended state.

A momentary loss of input bias that transitions the device into a suspended state has traditionally required one of two actions to resume data communication between devices. The first action is to physically unplug the IEEE-1394 serial data cables between the devices. This manual intervention is undesirable and can lead to consumer dissatisfaction. Such manual intervention is especially troublesome when a number of devices are daisy chained together. As a consumer will not know which link in the daisy chain caused the problem, the consumer may be forced to unplug and reconnect each of the IEEE-1394 serial data cables.

The second action that can cause a device in a suspended state to resume data communication requires the use of a smart controller. In such a system, a smart controller, a personal computer 110 for example, polls each of the devices and determines if any are unintentionally in a suspended state. If any devices are found to be in an unintentional suspended state, a resume command is sent. The disadvantage of this approach is that it requires the system to have a smart controller, which will not always be the case. For example, connecting a digital video recorder 102 to a digital television 106 for playback of recorded videotapes does not require a personal computer 110. In this case, no smart controller is present and neither device can transmit the required resume command. The consumer is therefore forced to physically unplug and reconnect the IEEE-1394 serial data cable.

When a device operating in the D/S mode encounters noise spikes on the input bias, it may interpret these spikes as a command to transition into a suspended mode. The nominal input bias voltage could be as low as 1.165 V while the threshold voltage for detecting loss of input bias can be as high as 1.0 V. A voltage drop of more than 0.2 V can occur when new devices are connected to the daisy chained network. This is especially likely to occur due to the in-rush of current required to drive the new device when the IEEE-1394 serial data cable powers the new device. One solution to this problem is to low-pass filter the line to remove these bias drops or noise spikes. However, as noted in the IEEE-1394a standard (see section 4.4.4), this filter must have a relatively short time constant of 200–300 ns. Unfortunately, bias drops and noise spikes have been observed empirically to have durations much longer than this.

SUMMARY OF THE INVENTION

These and other problems are generally solved or circumvented, and technical advantages are generally achieved, by preferred embodiments of the present invention that automatically return a device to an active state for continued transmission of data. By automatically returning the device to an active state, a consumer will avoid having to physically unplug and reconnect each device in a network or avoid the necessity of purchasing a smart controller and connecting each device thereto.

In accordance with a first embodiment of the present invention, a process is disclosed for automatically resuming data communication at a first physical layer interface port in an IEEE-1394 compliant communication system. In the process, the first physical interface port senses a connection with a second physical layer interface port and sets a connected flag to TRUE when the connection with the second physical layer interface port is sensed. The first physical interface port senses an input bias and clears an input bias flag to FALSE if the input bias is not sensed. Based upon these sensing steps, the first physical interface port sets a resume flag to TRUE if the connected flag is TRUE and the input bias flag is FALSE. By setting the resume flag to TRUE, the first physical interface port can automatically resume data communication.

In accordance with a second embodiment of the present invention, a physical layer interface port in an IEEE-1394 compliant communication system is disclosed that automatically resumes data communication. The physical layer interface port comprises two sensors and a processor. The first sensor sets a connected flag to TRUE when another physical layer interface port is sensed. The second sensor clears an input bias flag to FALSE when it does not sense an input bias. The processor, coupled to both the first and second sensors, sets a resume flag to TRUE if the connected flag is TRUE and the input bias flag is FALSE. The processor thereby automatically causes the physical layer interface port to resume data communication.

In accordance with a third embodiment of the present invention, a digital signal processor (DSP) for use in a physical layer interface communication port within an IEEE-1394 compliant communication system is disclosed that automatically resumes data communication. The DSP comprises processing code for setting a connected flag to TRUE when the physical layer interface port senses connection with another physical layer interface port. The processing code clears an input bias flag to FALSE when the physical layer interface port does not sense an input bias. Lastly, the processing code sets a resume flag to TRUE if the connected flag is TRUE and the input bias flag is FALSE. By setting the resume flag to TRUE, the processing code automatically causes the physical layer interface port to resume data communication.

An advantage of the present invention is that it minimizes the amount of consumer interaction required to keep a network of daisy-chained devices operating. By automatically returning devices to an active state, the consumer is not forced to disconnect each device in the network in an effort to find the device in a suspended state.

A further advantage of the present invention is that by automatically returning to an active state, the consumer is not forced to use a smart controller. As a personal computer is not needed to transfer data from the digital video recorder 102 to the digital television 106 for playback of recorded videotapes, consumer interaction and costs are reduced. Similarly, by not requiring a smart controller, two dumb devices such as the digital camera 100 and the printer 114 can be directly connected to print a series of photographs.

The foregoing has outlined rather broadly the features and technical advantages of the present invention in order that the detailed description that follows may be better understood. Additional features and advantages of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

A process and a system for implementing this process of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely consumer electronic devices. The invention may also be applied, however, to other communication systems operating under the IEEE-1394 standard or other similar standards or protocols.

Figure 1:
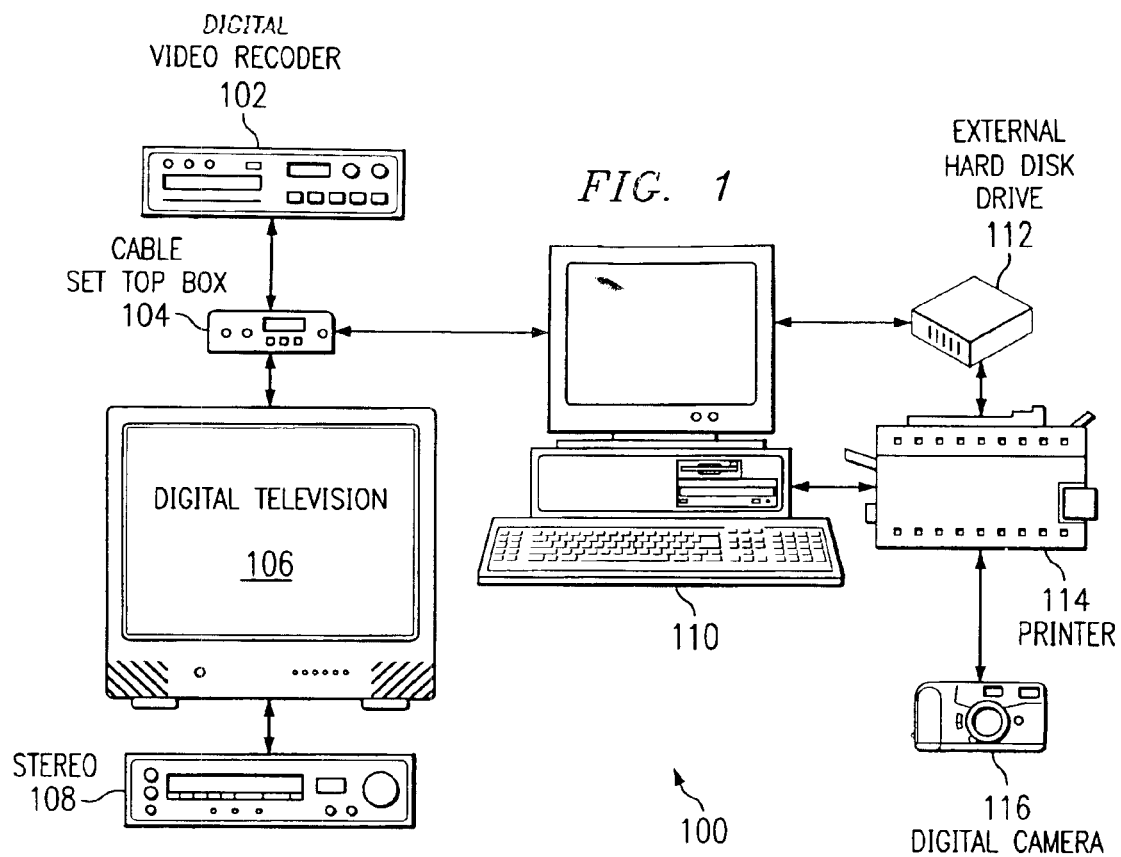
FIG. 1 is an overview of a network using the IEEE-1394 high-speed serial bus standard.
Figure 2:
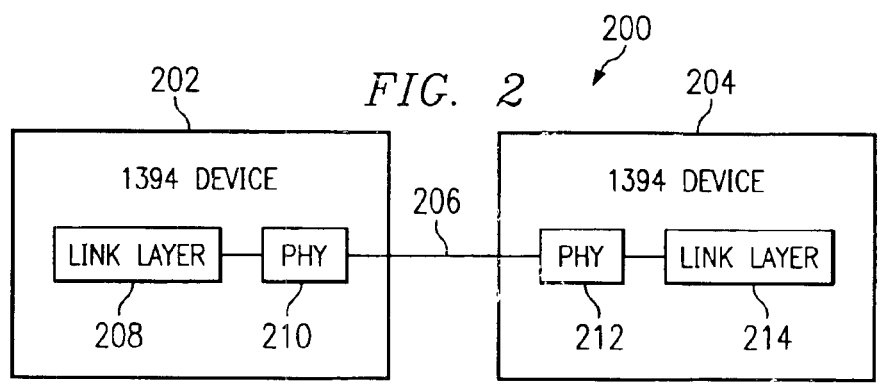
FIG. 2 illustrates a two-device communication system using the IEEE-1394 standard.

FIG. 2 illustrates a simple two-device network 200 using the IEEE-1394 standard. The network comprises a first device 202 and a second device 204 interconnected by an IEEE-1394 serial data cable 206. The first and second devices 202, 204 can correspond to devices such as the printer 114 and the digital camera 116 (or other devices) of FIG. 1. Within the first device 202 is a link layer 208 that receives data from circuitry (not shown) within the first device 202 and transfers it to a PHY port 210 within the first device 202. The PHY port 210 codes the data into the appropriate IEEE-1394 compliant serial format for transmission over the serial data cable 206. A peer PHY port 212 within the second device 204 receives the data. The peer PHY port 212 then decodes the received data and provides it to a link layer 214 within the second device 204 for use by the second device 204. While this process describes transferring data from the first device 202 to the second device 204, data can similarly be transferred from the second device 204 to the first device 202.

Of relevance to the present invention is the establishment of data transfer within the network 200 and the continued transfer of data. In particular, this data transfer may be interrupted by the possible loss of input bias that can cause the first and/or second devices 202, 204 to transition into suspended states.

Figure 3:
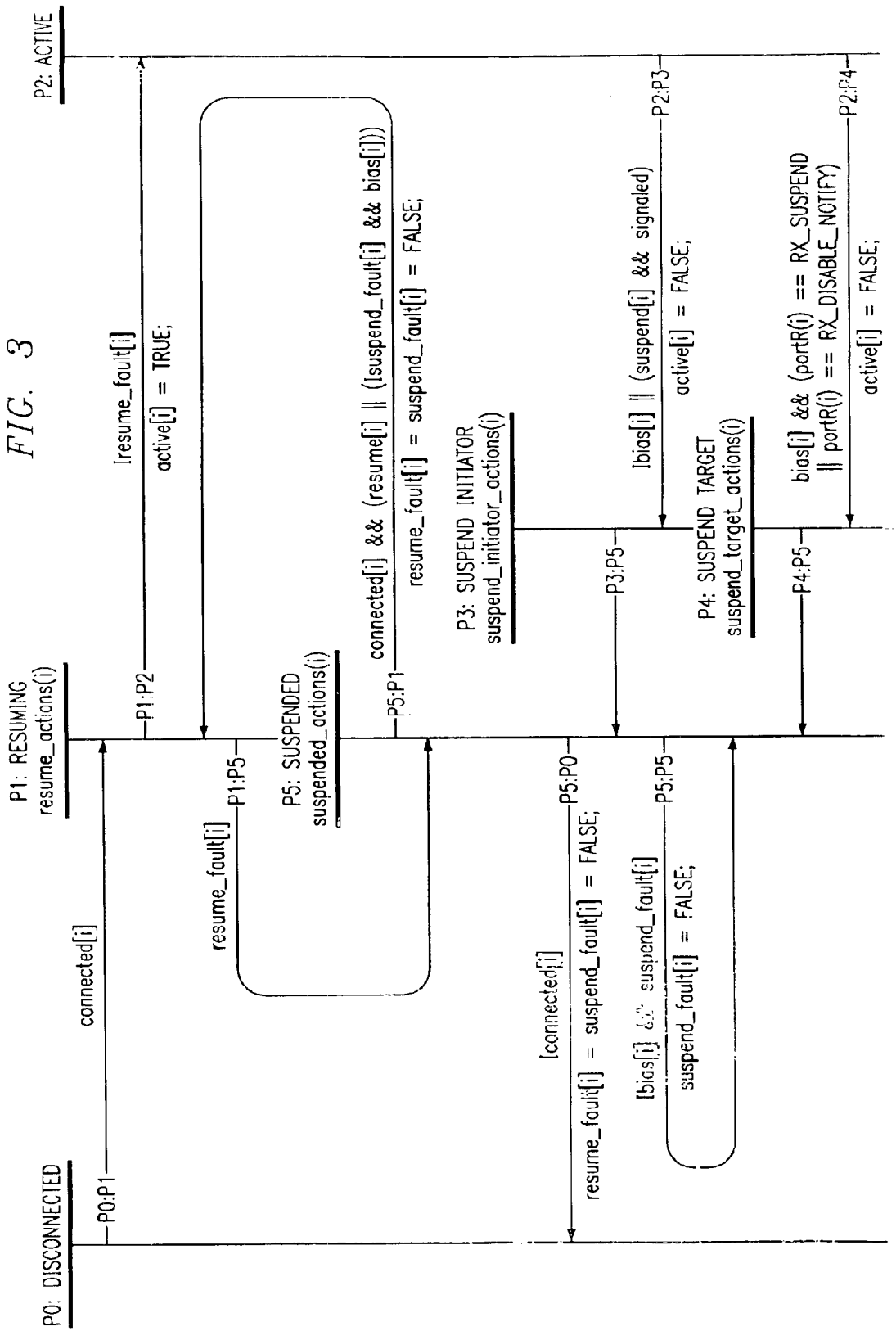
FIG. 3 illustrates the port connection state machine as implemented by the IEEE-1394a standard.

The relevant state machine diagram for the active and suspended states within the IEEE-1394a standard is shown in FIG. 3. While the following description is based upon the IEEE-1394a standard, it is applicable to the original IEEE-1394 standard and is also applicable to the proposed IEEE-1394b standard. The invention should also apply to subsequent revisions to the IEEE-1394 standard as these subsequent revisions are enacted.

Initially the first device 202 is not connected to the second device 204 via the IEEE-1394 serial data cable 206 and is represented by disconnected state P0. Upon connecting the first and second devices 202, 204 together, port connection detect circuitry in the PHY port 210 of the first device 202 signals that the peer PHY port 212 of the second device 204 has been connected. This transitions the PHY port 210 into a resuming state P1. In the resuming state P1, the PHY port 210 drives its own output bias and tests for the presence of input bias. Assuming the PHY port 210 is connected and that input bias is present, the PHY port 210 transitions to active state P2. In the active state P2, the PHY port 210 is fully operational and is capable of both transmitting and receiving data from the second device 204.

Once in the active state P2, the PHY port 210 remains in this active state P2 until one of three events occurs, in which case the PHY port 210 transitions into either a suspend initiator state P3 or a suspend target state P4. The first event is when the PHY port 210 functions as a suspend initiator due to receiving a remote command packet that sets the suspend variable to TRUE in the PHY port 210. The PHY port 210 in response transmits a remote confirmation packet acknowledging the suspend command and subsequently signals the peer PHY port 212 to suspend transmission. The PHY port 210 then transitions into the suspend initiator state P3. The second event occurs when the PHY port 210 receives either a receive disable or a receive suspend command that transitions the PHY port 210 into the suspend target state P4.

The third event, and the one addressed by the present invention, occurs when the PHY port 210 detects the loss of input bias. While this loss of input bias is usually due to unplugging the second device 204 from the network 200, it may be due to noise spikes under the IEEE-1394a standard. When the PHY port detects the loss of input bias, the PHY port 210 clears an input bias flag to FALSE. In this case, the PHY port 210 transitions into the suspend initiator state P3.

Once the PHY port 210 is in the suspend initiator state P3, it waits for the peer PHY port 212 to remove its bias. If the peer PHY port 212 does not remove its bias within a given period, then a suspend fault flag is set to TRUE. The PHY port 210 then discharges its own output bias and then places all of its outputs in a high impedance state. Similarly, if the PHY port 210 is in the suspend target state P4, it discharges its output bias to acknowledge receipt of the receive suspend signal and then places its outputs in a high impedance state. Upon putting its outputs in a high impedance state, the PHY port 210 transitions into suspended state P5 from either suspend initiator state P3 or suspend target state P4.

The PHY port 210 transitions into the resuming state P1 under either of two circumstances under the IEEE-1394a standard. The first occurs when the PHY port's resume flag is TRUE. In the prior art, a smart controller would be required to set the PHY port's resume flag to true after polling the PHY port 210 and determining that it was unintentionally in the suspend state P5. Alternatively, if the PHY port 210 detects input bias while the suspend fault flag is FALSE, the PHY port 210 again transitions into the resuming state P1. Without a smart controller to set the PHY port's resume flag to TRUE, the consumer faces physically unplugging the first device 202 from the network 200, thereby forcing the PHY port 212 to reinitialize itself when the first device 202 is reconnected to the network 200.

The present invention avoids the need for a separate smart controller or consumer intervention by having the PHY port 210 automatically set the PHY port's resume flag to TRUE. Table 1 shows a subroutine from the IEEE-1394a standard for handling the suspend initiator state P3. It should be noted that while at least two actions can invoke this subroutine, one is most relevant to the present invention. The action of interest is when the PHY port 210 detects a loss of input bias and clears the input bias flag to FALSE. The other action that invokes this subroutine is when the PHY port 210 receives a remote command packet that sets the suspend variable to TRUE in the PHY port 210.

TABLE 1

```
void suspend_initiator_actions() {
        connect_timer = 0;                      // Used to debounce bias or for bias handshake
        if (!suspend[i]) {                      // Unexpected loss of bias?
    suspend[i] = TRUE;                          // Insure suspend_in_progress() returns TRUE
            if (child[i])   // Yes, parent still connected?
                isbr = TRUE;                    // Arbitrate for short reset
            else
                ibr = TRUE;                     // Transition to R0 for reset
            activate_connect_detect(i, 0);
            while (connected[i] && connect_timer < CONNECT_TIMEOUT / 2); // see if bias lost because of
    physical disconnection
            if (connected[i])                   // A1 -- Still connected?
                resume[i] = TRUE;               // A2 -- Yes, cause port to automatically resume.
        }
        else {                                  // Instructed to suspend
            signaled = FALSE;
            while ((connect_timer < RECEIVE_OK_HANDSHAKE) && bias[i]);   // Wait for suspend target to
    deassert bias
            suspend_fault[i] = bias[i];         // Suspend handshake refused by target?
            activate_connect_detect(i, RECEIVE_OK_HANDSHAKE); // Also guarantees handshake timing
        }
}
```

Once the PHY port 210 is in the suspended state P5, it generally places most of the PHY port's circuitry in a low-power consumption state. The PHY port 210 remains in a suspended state P5 if the PHY port 210 transitioned into the suspended state P5 under the fault condition noted above, i.e., the peer PHY port 212 did not remove the input bias. The suspend fault flag is only cleared to FALSE when the peer PHY port 212 removes the input bias. Once the suspend fault flag is cleared to FALSE the PHY port 210 can transition states.

From the suspended state P5, the PHY port 210 either transitions into the disconnected state P0 or the resuming state P1. The PHY port 210 transitions into the disconnected state P0 when it loses physical connection to the peer PHY port 212 as determined by the port connection detect circuitry that remains active even in the suspended state P5.

The embodiment of the invention in Table 1 includes the addition of two lines of code, A1 and A2,that set the PHY port's resume flag to TRUE when the PHY port 210 and its peer PHY port 212 are still connected. By ensuring that the PHY port's resume flag is TRUE, this rapidly forces the PHY port 210 to transition through the suspended state P5 into the resuming state P1. The code ensures the PHY port 210 and its peer PHY port 212 are connected as it is undesirable for the PHY port 210 to attempt transitioning to an active state P2 when the suspended state P5 was due to the second device 204 being disconnected from the network 200 and communication is no longer possible.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, means, methods and steps described in the specification. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A process for resuming data communication at a first physical layer interface port in a communication system, the process at the first physical layer interface port comprising:
   setting a connected flag to TRUE when a second physical layer interface port is sensed;
   clearing an input bias flag to FALSE if an input bias is not sensed; and
   setting a resume flag to TRUE if the connected flag is TRUE and the input bias flag is FALSE, thereby automatically causing the first physical layer interface port to resume data communication.

2. A process in accordance with claim 1, wherein the communication system is an IEEE-1394 compliant communication system.

3. A process in accordance with claim 1, wherein the first physical layer interface port comprises a PHY.

4. A physical layer interface port in a communication system, the physical layer interface port comprising:
   a first sensor, the first sensor for causing a connected flag to be set to TRUE when a different physical layer interface port is sensed;
   a second sensor, the second sensor for causing an input bias flag to be cleared to FALSE when an input bias is not sensed; and
   a controller coupled to the first sensor and the second sensor, the controller for causing a resume flag to be set to TRUE if the connected flag is TRUE and the input bias flag is FALSE, the controller thereby automatically causing the physical layer interface port to resume data communication.

5. A physical layer interface port in accordance with claim 4, wherein the communication system is an IEEE-1394 compliant communication system.

6. A physical layer interface port in accordance with claim 4, wherein the physical layer interface port comprises a PHY.

7. A physical layer interface port in accordance with claim 4, further comprising a link layer coupled to the controller, the link layer for transmitting data from a device including the physical layer interface port to the controller, the link layer for receiving data from the controller and providing the data to the device including the physical layer interface port.

8. A physical layer interface port in accordance with claim 4, further comprising a data communication port coupled to the controller, the data communication port for transmitting data to the different physical layer interface port, the data communication port for receiving data from the different physical layer interface port.

9. A physical layer interface port in a communication system, the physical layer interface port comprising:
   means for setting a connected flag to TRUE when a second physical layer interface port is sensed;
   means for clearing an input bias flag to FALSE if an input bias is not sensed; and
   means for setting a resume flag coupled to the means for setting the connected flag, the means for clearing the input bias, the means for setting the resume flag setting the resume flag to TRUE if the connected flag is TRUE and the input bias flag, thereby automatically causing the physical layer interface port to resume data communication.

10. A physical layer interface port in accordance with claim 9, wherein the communication system is an IEEE-1394 compliant communication system.

11. A physical layer interface port in accordance with claim 9, wherein the physical layer interface port comprises a PHY.

12. A physical layer interface port in accordance with claim 9, further comprising:
   means for transmitting data from a device including the physical layer interface port to the means for setting the resume flag, the means for transmitting data coupled to the means for setting the resume flag; and
   means for receiving data from the means for setting the resume flag and providing the data to the device including the physical layer interface, the means for receiving data coupled to the means for setting the resume flag.

13. A physical layer interface port in accordance with claim 9, further comprising means for data communication coupled to the means for setting the resume flag, the means for data communication for transmitting data to the second physical layer interface port, the means for data communication for receiving data from the second physical layer interface port.

14. A digital signal processor for inclusion in a physical layer interface port in a communication system, the digital signal processor comprising:
   digital signal processing code for
      setting a connected flag to TRUE when another physical layer interface port is sensed;
      clearing an input bias flag to FALSE if an input bias is not sensed; and
      setting a resume flag to TRUE if the connected flag is TRUE and the input bias flag, thereby automatically causing the first physical layer interface port to resume data communication.

15. A digital signal processor in accordance with claim 14, wherein the communication system is an IEEE-1394 compliant communication system.

16. An IEEE-1394 compliant PHY comprising:
   a data communication port, the data communication port for transmitting data to a different IEEE-1394 compliant PHY, the data communication port for receiving data from the different IEEE-1394 compliant PHY;
   a first sensor, the first sensor for causing a connected flag to be set to TRUE when the different physical layer interface port is sensed;
   a second sensor, the second sensor for causing an input bias flag to be cleared to FALSE when an input bias is not sensed; and
   a controller coupled to the data communication port, the first sensor and the second sensor, the controller for causing a resume flag to be set to TRUE if the connected flag is TRUE and the input bias, the controller thereby automatically causing the IEEE-1394 compliant PHY to resume data communication.

* * * * *